Figure 4:
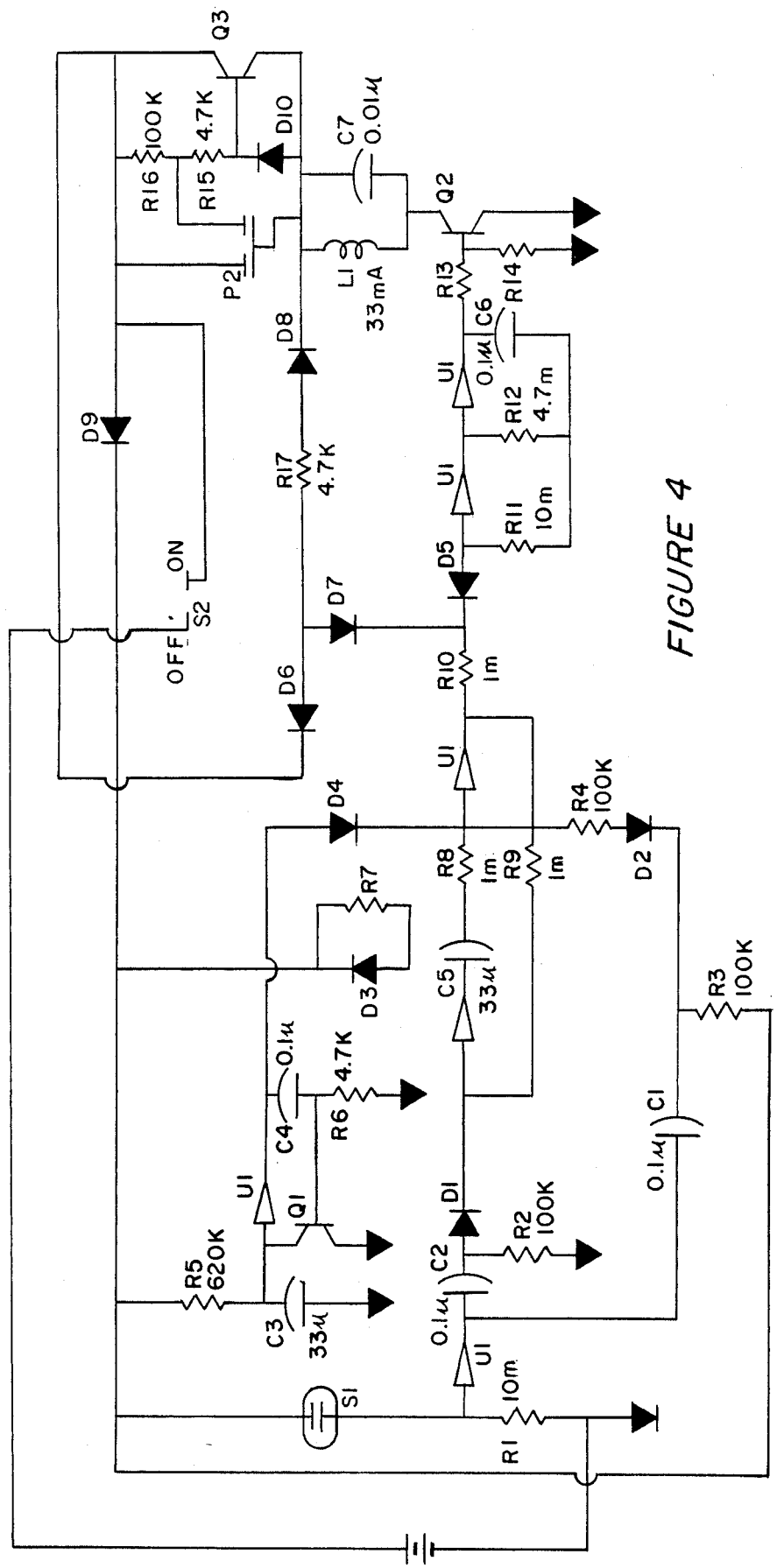

United States Patent [19]

Ames

[11] Patent Number: 4,980,667
[45] Date of Patent: Dec. 25, 1990

[54] MOTION SENSITIVE BICYCLE ALARM

[76] Inventor: Steven Ames, 4064 Mahaila Ave., Ste. B, San Diego, Calif. 92122

[21] Appl. No.: 422,234

[22] Filed: Oct. 16, 1989

[51] Int. Cl.⁵ .................................. B62J 3/00
[52] U.S. Cl. .............................. 340/427; 340/432
[58] Field of Search ............... 340/432, 427, 429, 430

[56] References Cited

U.S. PATENT DOCUMENTS

| | | | |
|---|---|---|---|
| 3,961,323 | 6/1976 | Hartkorn | 340/429 |
| 4,006,452 | 4/1990 | Giacino | 340/427 |
| 4,151,506 | 4/1979 | Schoennetz | 340/427 |
| 4,379,281 | 4/1983 | Thomas | 340/427 |

Primary Examiner—Joseph A. Orsino
Assistant Examiner—Frank M. Scutch, III
Attorney, Agent, or Firm—Selwyn S. Berg

[57] ABSTRACT

A bicycle which sounds an audible signal on motion of the bicycle is described. The alarm system is totally self contained and appropriately attached to the frame of the bicycle. It contains critical delay circuits which gives the bicycle rider the opportunity to arm and disarm the alarm by a key switch without tripping the audible alarm. Additional circuitry prevents the audible alarm from remaining in an on state indefinitely after the alarm is tripped, thereby conserving battery power. Said bicycle includes a motion detection switching means, alarm timer means, limit means and oscillator means all conveniently contained in a compact package. Recent progress in the development of energy efficient audible alarms assures a loud signal on the impermissible motion of the bike.

1 Claim, 2 Drawing Sheets

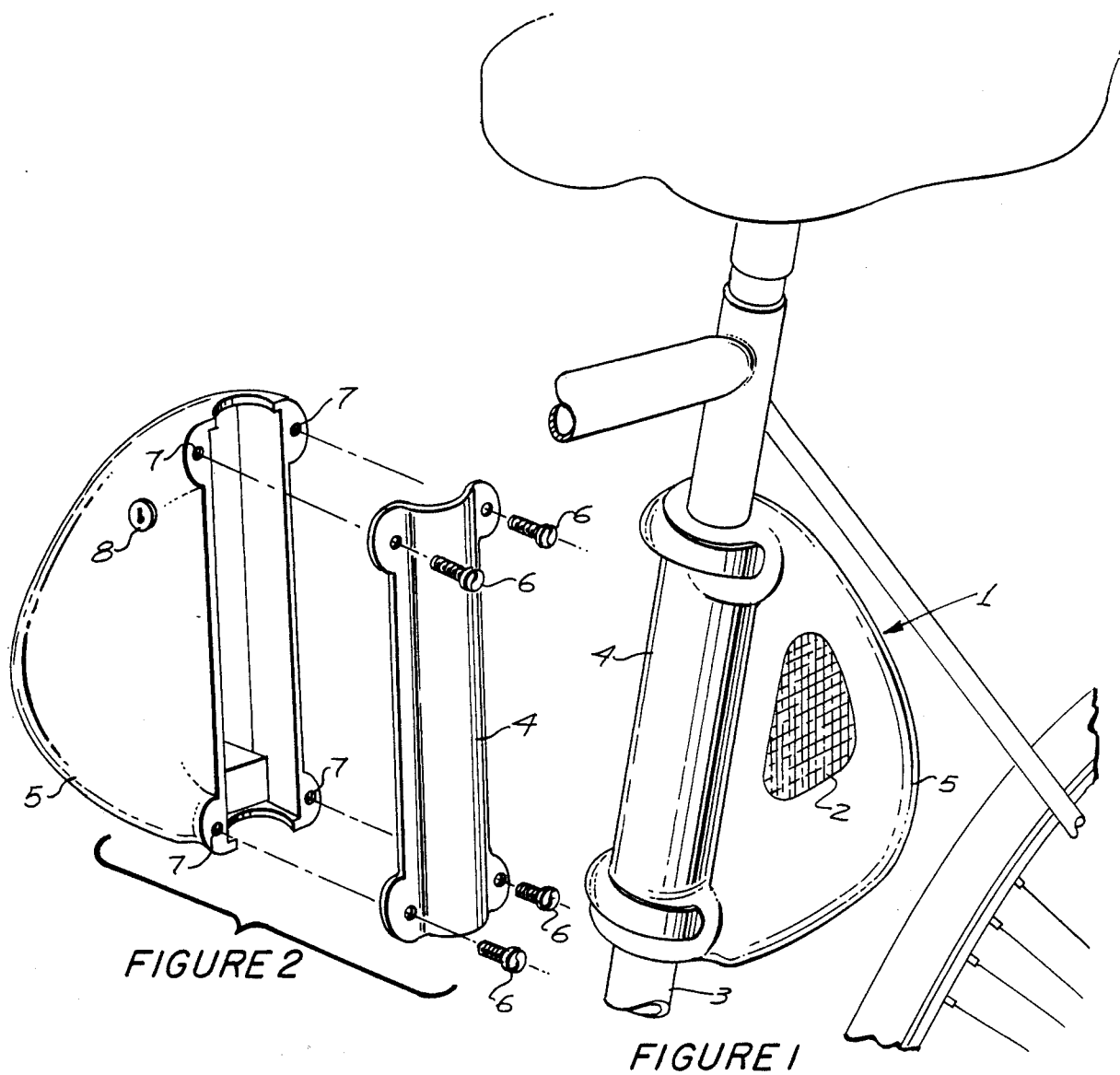
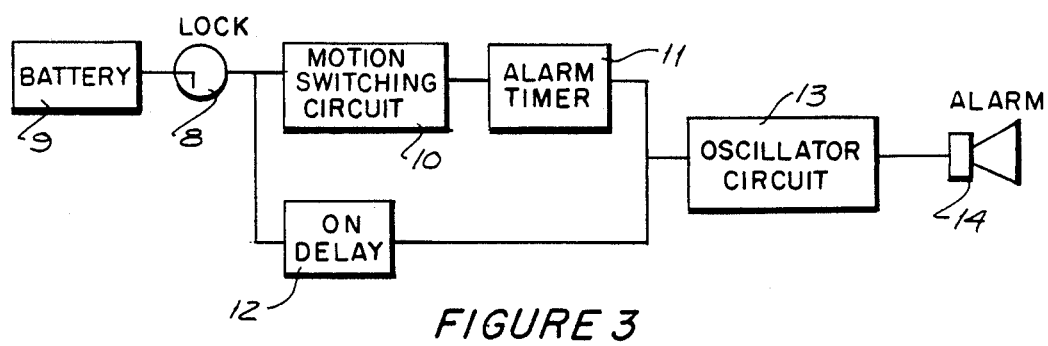

MOTION SENSITIVE BICYCLE ALARM

BRIEF SUMMARY OF INVENTION

Motion sensitive devices are commonly used in security systems. Such devices detect unauthorized motion or intrusion. Because of the unique nature of the subject to be monitored, different systems based on different principals must be used.

A subject bicycle is a fully exposed vehicle, so intrusion can not be prevented and a security device will be fully exposed. Informing a potential thief about the existence of a security device is known to have some deterrent effects. Nonetheless, the device must be securely attached and tamper-proof so that the potential thief could not disable the alarm. The device is securely attached with several screws, weather-proofed by employing lapped joints and encasing the circuit board. A universal system adjustable to all bicycle frames is achieved by using shims.

The device is armed and disarmed by a miniature key switch. A piezoelectric high efficiency audio generator produces a distinctive loud sound as an alarm. The alarm is triggered by any significant motions and continues for one minute after the motion stops.

Though the standard system of preventing bicycle theft is by locking frames and wheels to a substantial immoveable object like a pole, often such a stanchion is not available. Many bike owners have locked their bikes through the wheel, only to find the bike was stolen by separating the wheel from the bike. A major theft of bikes occur from unlocked bikes left outside for a few minutes while the biker shops. There is one common denominator to all bicycle thefts, and that is the moving of the bike from one place to another. This invention detects and alarms any such movement.

REFERENCES TO DRAWINGS

FIG. 1. A view of the alarm grill side of device mounted on the bike.

FIG. 2. Blow-up of the device showing chassis and clamping bracket.

FIG. 3. Block diagram of circuit.

FIG. 4. Detailed schematic of circuitry.

DETAIL OF EMBODIMENT

The Alarm Device is intended to be mounted vertically on the frame of the bicycle. As shown in FIGS. 1 and 2, the mechanical section is comprised of three components: the alarm shell, 1, on which is the grill, 2; the lock shell, 5, on which the on/off lock, 8, is mounted, and these two mating shells are sealed together to form a chassis for the electronic components, replaceable battery, and mechanical parts; the clamp shell, 4, is joined with said chassis by a multiplicity of mounting screws, 6, to encompassingly embrace a vertical tubular section of the bike frame, 3. Not illustrated are shims which may be inserted between the shell clamp and chassis to compensate for different tubular diameters. Said mounting screw, 6, can also have special screw heads to discourage removal.

The lock, 8, is an electrical contact switch which is actuated on or off by its own unique key. Beneath the alarm grill, 2, is a piezoelectric ceramic sound transducer protected by a nylon mesh fabric screen. This alarm is capable of outputting more than 85 dB at about 30 centimeters of a nominal 4.6 KHz frequency from a 9 volt, 15 milliamp power source. Said alarm produces a loud and penetrating audible sound.

A block diagram is shown in FIG. 3. A battery, 9, supplies the power which may be switched on or off to the circuit through a electrical switch lock, 8. When the key turns the lock switch "on", the system is armed in about 15 seconds. This interval is controlled by the on-delay, 12. Said on-delay prevents the actuation of the alarm when the biker removes the key, should this cause any motion. The motion switching circuit, 10, detects movement and initiates and electronic toggle turning on the electrical timer, 11. After the motion ceases, the timer holds the toggle on for about 1 minute. The oscillator circuit, 13, has appropriate buffers and drivers to power the alarm, 14, which was described above.

The detail components to effectuate the block diagram of FIG. 3 is shown in FIG. 4. Though specific generic components are described, said designations are not limiting. The mechanical motion transducing switch shown as S1 in FIG. 4 is a generic mercury switch. In a mercury switch a pool of mercury moves about when agitated and wets contact points creating a conductive path between said contact points.

If the bike is moved after the system is armed, the alarm will sound and a loud and audibly penetrating signal will persist for about 1 minute after the motion has stopped. Said sound is audible for over 30 feet, and is capable of calling attention to a tampering with a bicycle.

The Inventor claims:

1. A bicycle motion circuit contained in a weather-proof chassis attached to a frame of a bicycle, comprising:

a battery means for powering said circuit, an electrical switching key and lock means, actuated on/off by said key, and connected to said battery means which turns said circuit on and off, a motion detection switching means connected to the output of said lock and capable of changing from a passive state to an active state on being moved, an alarm timer means which is connected to said motion switching means which limits the duration of power drain from said battery through said circuit and connected to motion switching circuit, an on-delay timing means which senses said actuation to on state of said lock means preventing the initiation of alarm and connected to said lock and thereby delaying arming of said circuit, an oscillator means with buffers, drivers, and resonate reactive components all connected to said alarm timer, an audible alarm means connected to said oscillator, so when said bicycle motion alarm system is initially turned on by turning said lock to an on state, arming is delayed, but after said on delay period, any motion initiates said alarm timer to operate said oscillator driving said audible alarm until after motion has ceased.

* * * * *